(No Model.)
J. F. McLAUGHLIN.
SECONDARY BATTERY ELECTRODE.
No. 410,007. Patented Aug. 27, 1889.
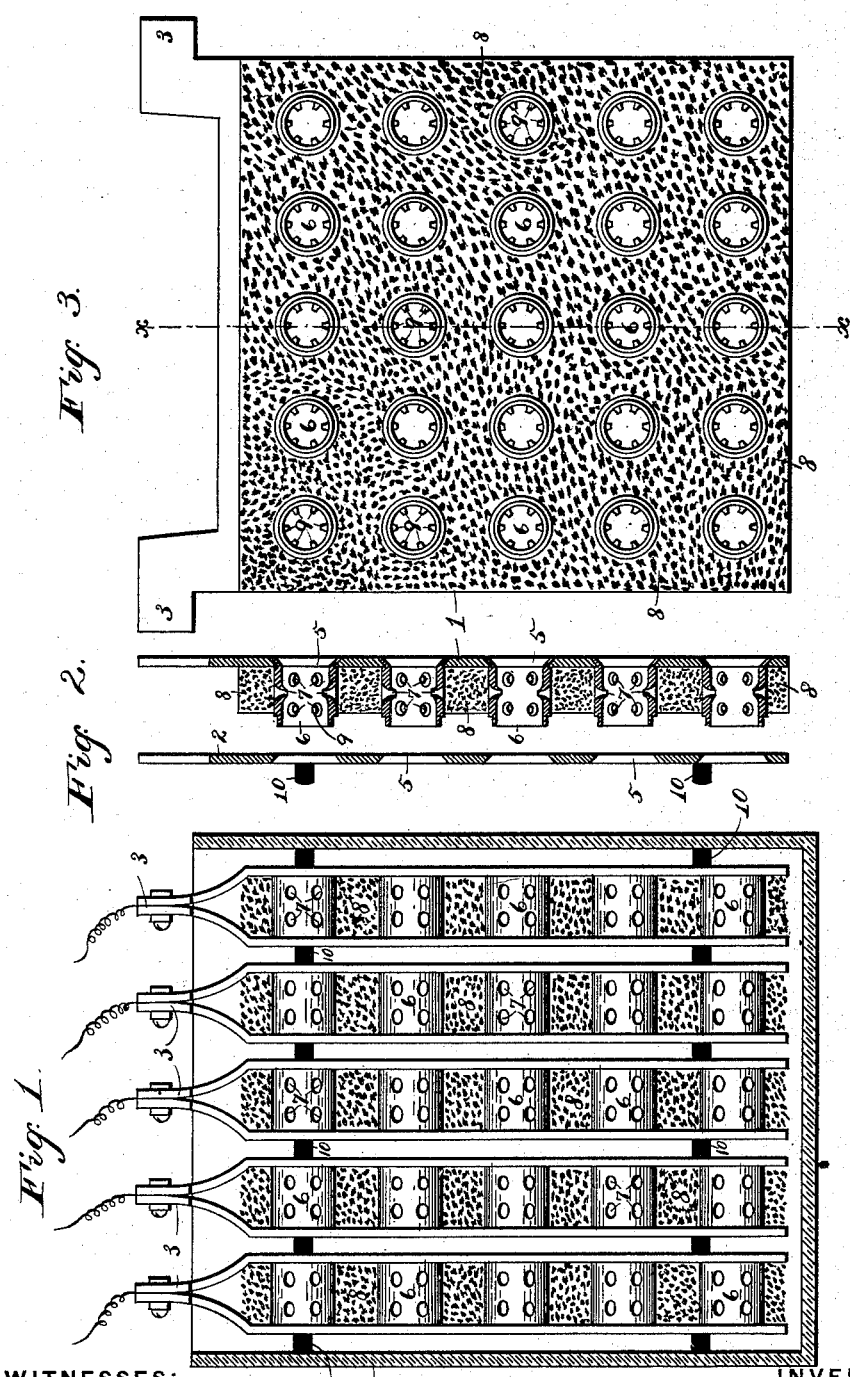
WITNESSES:
INVENTOR
James F. McLaughlin,
By Joseph Lyon,
Attorney

UNITED STATES PATENT OFFICE.

JAMES F. McLAUGHLIN, OF PHILADELPHIA, PENNSYLVANIA.

SECONDARY-BATTERY ELECTRODE.

SPECIFICATION forming part of Letters Patent No. 410,007, dated August 27, 1889.

Application filed July 10, 1889. Serial No. 317,019. (No model.)

*To all whom it may concern:*

Be it known that I, JAMES F. McLAUGHLIN, a citizen of the United States, and a resident of Philadelphia, in the county of Philadelphia and State of Pennsylvania, have invented certain new and useful Improvements in Secondary-Battery Electrodes, of which the following is a specification.

My invention relates to improvements in electrodes for secondary batteries, its object being to produce a secondary-battery electrode wherein a great amount of active material is safely lodged in such a manner that it will not be detached by the vibrations to which the secondary battery is subjected when used for the propulsion of vehicles.

My improvement is illustrated in the accompanying drawings, in which—

Figure 1 represents a vertical section of a secondary-battery jar with a number of my improved electrodes. Fig. 2 is a vertical section on line $x$ of Fig. 3, showing the parts of my improved electrode-plate slightly separated and in position to be applied to each other; and Fig. 3 is an elevation of the tubes of the supporting-plate of my electrode with the active material applied thereon and the face-plate removed.

Like numerals of reference indicate like parts all throughout the drawings.

Referring now to the drawings, each electrode-plate is shown as consisting of two plates of lead or other suitable material, with short sections of tubing extending between and through the plates. These plates are in the main rectangular in shape and are marked in the drawings 1 and 2, respectively. They are both provided with lug-extensions 3 3, which are designed to support the electrode upon the edges of the battery-jar 4. Each plate has formed in it a series of holes 5 5, designed to receive the ends of short sections of lead tubing 6, these holes being preferably chamfered, so that when the ends of the tubes have been inserted into the same the edges of these tubes may be bent outwardly by a suitable tool, being thus pressed against the chamfer, and thus, as it were, riveted into the plate. To more securely mount the tubes upon the plates, each of these tubes may have formed a short neck at each end, as indicated in Fig. 2. These tubes 6 6 are first riveted to one of the plates 1, constituting my improved electrode, and this plate 1, I shall hereinafter refer to as the "supporting-plate," as distinguished from the plate 2, which I call the "face-plate" of the electrode. The tubes 6 6 have a series of perforations formed through their walls, as indicated at 7, and by preference these holes are made by a punch, leaving a burr in the interior of the tubes, the object of which will presently appear. After all the tube-sections have been mounted upon the supporting-plate 1, the latter has the appearance shown in Fig. 2 in section and in Fig. 3 in plan view. I then prepare a plate of active material having approximately the size of the supporting-plate, this active material being preferably composed of red-lead oxide formed into a paste by the admixture of diluted sulphuric acid, and when in such pasty condition the active material is subjected to great pressure in a die or otherwise, and is then baked to form a solid coherent mass, which retains its shape and may be handled with impunity, somewhat in the manner of a piece of crockery. This baked plate of active material is formed with a series of holes corresponding in size, number, and order to the holes originally formed in the plates 1 2, so that it may be applied to the supporting-plate 1, with the holes formed in it passing over the tube-sections mounted in the latter. This baked plate of active material is marked in the drawings with the numeral 8, and, as shown in Fig. 2, its thickness is nearly but not quite equal to the length of the tube-sections projecting from the supporting-plate. The face-plate 2 is now likewise applied to the supporting-plate over the ends of the tube-sections, and is securely pressed into contact with the baked plate of active material, after which the free edges of the tube-sections are forced outwardly against the chamfers in the holes of the face-plate, whereby all the elements of the electrode, consisting of the supporting-plate 1, the perforated tube-sections 6, the baked plate B of active material, and the face-plate 2, are securely assembled and rigidly held together. The projecting lugs 3 3 of the two plates 1 2 are then each bent inwardly toward each other, as shown in Fig. 1, and they serve as the points of attachment for the wires or conductors used for properly connecting the plates of one cell to be charged as one pair of electrodes, as is the ordinary custom, and for connecting the charging and discharging circuit terminals with the battery. The tube-sections 6 6 are open at each end and the electrolyte used in the battery freely circulates through these tubes and reaches the active material by the perforations 7. When the secondary battery is being charged, the active material, where it is exposed to the action of the electrolyte, becomes spongy and expands, thus protruding through the perforations 7 into the interior of the tube-sections, and creeping over from one perforation to the other, thus still more securely locking the baked plate of active material and preventing its displacement or shaking with relation to the two plates. The burrs about the perforations 7 in the interior of the tube-sections 6, which are marked in the drawings by the numeral 9, materially add to this locking action of the protruding active material.

It will be understood that the exposed edges of the baked plate of active material will also be acted upon by the charging-current.

Secondary-battery plates constructed in accordance with my invention I have found very effective and very good. They are not deteriorated by the jarring and jolting to which they are subjected when used as the propelling-power for electric locomotives, and they retain their shapes under the most adverse circumstances.

By preference the plates are assembled in the jar very close together, and in order to prevent short circuits I insert either in the supporting-plate 1 or in the face-plate 2 short pieces of hard-rubber 10 10, projecting from the sides of said plates and serving the double purpose of spacing the electrodes and of insulating them from each other.

Having now fully described my invention, I claim and desire to secure by Letters Patent—

1. A secondary-battery electrode composed, essentially, of two lead plates and a compressed and baked plate of active material clamped between them, substantially as described.

2. In a secondary-battery electrode, the combination of two lead plates held a distance apart by lead tubes extending between and through the same and a baked plate of active material filling the space between the lead plates and between the tubes, substantially as described.

3. In a secondary-battery electrode, the combination of two lead plates held a distance apart by lead tubes having perforated walls and a baked plate of active material filling the space between the lead plates and tubes, substantially as described.

In testimony whereof I have signed my name to this specification in the presence of two subscribing witnesses.

JAMES F. McLAUGHLIN.

Witnesses:
H. F. REARDON,
F. T. CHAPMAN.